UNITED STATES PATENT OFFICE.

ANTONIO PELLETIER, OF WASHINGTON, DISTRICT OF COLUMBIA.

PAVING AND BUILDING MATERIAL.

SPECIFICATION forming part of Letters Patent No. 254,366, dated February 28, 1882.

Application filed December 7, 1881. (No specimens.)

*To all whom it may concern:*

Be it known that I, ANTONIO PELLETIER, of the city of Washington, in the county of Washington and District of Columbia, have invented certain new and useful Improvements in Paving and Building Material, of which the following is a specification.

My invention applies more particularly to artificial-stone paving material to be used preferably in blocks for paving the roadways of streets; but the same may be used for sidewalks as well, and in either case the composition may be laid as a continuous or block pavement, and by molding it into the proper shape the material may be used in the erection of buildings or construction of sewers, and is adapted to all purposes where artificial or natural stone can be used. I do not limit myself in the use of the material for any specific purpose.

In preparing my material I first provide either broken rock or stone or sand, as may be most suitable for the purposes for which the composition is to be used, broken rock or stone about the size of shelled corn being preferable for street-roadways and sometimes for sidewalks, while sand or finer crushed rock or stone might be better for building-stone or other purposes, and coarser rock for other purposes still; second, I provide asphaltum or bitumen or hydraulic cement or other material, which has the quality of adhesiveness according to the purpose for which it is to be used, asphaltum or bitumen being better adapted for street-paving purposes, while a hydraulic cement would be better for the preparation of a building-stone, and other adhesive material might be preferable for other purposes; third, I provide an oxide of any base, preferably of some of the heavy metals—such as iron or manganese or zinc or calcium; and, fourth, I provide a chloride of the same base as the oxide provided.

If it is desired to make a pavement for streets, I take of the broken or crushed rock or stone from eighty to ninety parts. It may be well to add a little sand, especially if there is not sufficient fine material arising from the crushing of the stone. I then add a certain quantity of the oxide, say, from five to ten parts; but if the stone used contains an oxide of any metal or other base, it may not be necessary to add more; but if added it will do no harm. To this mixture I add about one part of a chloride of the same base as the oxide used or contained in the stone. For example, when I use a stone containing a carbonate of lime, by adding a chloride of calcium the oxide of calcium in the stone will unite with the chloride of calcium added to form an oxychloride of calcium; or, besides adding a chloride of calcium, I could add to the mixture an oxide and a chloride of some other base besides the calcium—such as of iron, for instance—and then have my material contain a double combination—that is, an oxychloride of calcium and of iron. Undoubtedly this would improve the material, for I claim that by combining in an artificial-stone the oxide of one or more bases with the chloride of the same base or bases an oxychloride of such base or bases is formed, and that thereby the material is held more firmly together, in fact partakes of the nature of a natural stone; and in time the oxychloride takes the place of the binder first used in the construction of the stone—such as asphalt, bitumen, pitch, tar, cement, &c. From this mixture of the broken stone, the oxide, and the chloride I drive off the moisture by means of heat, and while in a heated state I add about three to ten parts of asphaltum, bitumen, pitch, or other binder which has been previously heated, and mix the four ingredients thoroughly together while hot.

The necessity of mixing the ingredients while hot is to obtain a close adhesion of the binder to the broken rock and other material used, and thus insure their close adhesion to each other. I mention heat as one means of accomplishing this object. Other means may be employed. When hydraulic cement or other substances of like nature answering the same purpose is used for a binder instead of asphaltum, &c., heat will not be required in mixing the ingredients; on the contrary, water will have to be added. It is essential that the mixing be very thorough, so that each particle of the stone shall be coated with the binder and thus make a saving in the use of the material employed as a binder.

In cases where heat is required for a thorough mixture, the material while hot may be laid and rolled as a continous pavement, or may be pressed into blocks of any suitable size and shape and then laid at any time.

It is not essential to add the chloride before the laying of the pavement or pressing the material into blocks. It may be done afterward by treating the pavement or blocks or artificial stone made for other purposes to a bath of a solution of a chloride of the base, an oxide of which is contained in the pavement, block, or stone, or the chloride may be added in the first instance and the pavement or block afterward treated to a bath of a solution of the oxide; or the block or pavement after made or laid may be treated to a bath of a mixture of a solution of the oxide and the chloride, or to a bath of each separately.

In cases where a hydraulic cement or its equivalent above mentioned is used as a binder in the place of asphaltum, &c., it may be necessary to add more sand or crush the stone or rock finer, and in such cases the proportion of the binder to the other material used should be increased.

Having fully described my invention, what I desire to claim and secure by Letters Patent is—

1. The combination of asphaltum or bitumen with sand or broken rock or stone, and an oxide of any metal or other base, and a chloride of the same base, in varying proportions, substantially as specified.

2. The combination of sand or broken rock or stone, and an oxide of any metal or other base, and a chloride of the same base with any mineral or vegetable bituminous or gluey substance to be used as a binder in varying proportions, substantially as specified.

ANTONIO PELLETIER.

Witnesses:
H. R. PEBBLES,
F. S. OSBORNE.